United States Patent [19]

Mitsuhashi et al.

[11] Patent Number: 5,422,072

[45] Date of Patent: Jun. 6, 1995

[54] ENHANCED CO-BASED ALLOY

[75] Inventors: Akira Mitsuhashi; Kensho Sahira; Saburo Wakita, all of Saitama, Japan

[73] Assignee: Mitsubishi Materials Corp., Tokyo, Japan

[21] Appl. No.: 170,384

[22] Filed: Dec. 20, 1993

[30] Foreign Application Priority Data

| Dec. 24, 1992 | [JP] | Japan | 4-357629 |
| Dec. 24, 1992 | [JP] | Japan | 4-357630 |
| Aug. 4, 1993 | [JP] | Japan | 5-212252 |
| Aug. 4, 1993 | [JP] | Japan | 5-212253 |

[51] Int. Cl.$^6$ .................. C22C 19/07; C22C 30/00
[52] U.S. Cl. ................. 420/436; 420/440; 420/585; 420/586; 420/588
[58] Field of Search ........... 420/436, 440, 585, 586, 420/588; 148/408, 419, 425, 442

[56] References Cited

U.S. PATENT DOCUMENTS

| 4,618,474 | 10/1986 | Ohe et al. | 420/440 |
| 4,765,817 | 9/1988 | Gaul | 420/436 |
| 4,877,435 | 10/1989 | Haebale et al. | 148/410 |
| 5,240,491 | 8/1993 | Budinger et al. | 428/668 |

OTHER PUBLICATIONS

Derwent Abs 86-003140 of JP60-228,637, 1986.

Primary Examiner—George Wyszomierski
Assistant Examiner—Margery S. Phipps
Attorney, Agent, or Firm—Vincet Kohli; Peter J. Gluck; Morrison Law Firm

[57] ABSTRACT

A Co-based alloy exhibits superior high-temperature strength and resistance properties. In one embodiment, the Co-based alloy contains, in weight percent, from about 0.1 to about 1.2 of C; from about 0.01 to about 2 of at least one of Si and Mn; from about 22 to about 37 of Cr; from about 5 to about 15 of Ni; from about 0.1 to about 3.5 of Re; with a balance being Co and incidental impurities. Co and C, Si, Mn, Cr, Ni, Re, B, Zr, W, Mo, Ta, and Nb impart high-temperature wear resistance to the alloy to withstand repeated temperature cycling in a glass spinnaret. In one embodiment of the present invention, Hf is added to improve molten glass corrosion resistance, while Y and other rare earth elements are added in alternate embodiments to improve high-temperature oxidation resistance. Percentages by weight are disclosed for enhanced high-temperature oxidation resistance, increased fluid wear resistance and enhanced molten glass corrosion resistance.

26 Claims, No Drawings

ENHANCED CO-BASED ALLOY

BACKGROUND OF THE INVENTION

The present invention relates to a Co-based alloy exhibiting enhanced high-temperature strength and enhanced high-temperature oxidation resistance. The Co-based alloy of the present invention also exhibits increased fluid wear resistance and enhanced molten glass corrosion resistance.

Conventional glass fiber formation involves heating molten glass to about 1000 degrees Celsius, and loading the molten glass into a spinneret which is then rotated at high speed (1700 revolutions per minute, for example) to extrude the molten glass from nozzles radially disposed along the side wall of the spinneret utilizing centrifugal force. It is known that the glass fiber forming spinnerets must exhibit adequate high-temperature strength and be high-temperature oxidation resistant in addition to being molten glass corrosion resistant. As such, the spinneret may be made of a Co-based alloy, which has been described in Japanese Patent Laid Open No. 63-30384, for example.

In an attempt to improve wear resistance of prior art turbine nozzles and gas turbine vanes Japanese Laid Open Patent Publication No. 3-43813 teaches the use of Co-based alloys for making turbine nozzles and gas turbine vanes.

In recent years, gas turbine output and speed of glass fiber formation have greatly increased. This, in turn, has created a concomitant demand for gas turbine components and glass fiber forming spinnerets exhibiting high-temperature strength. However, neither any of the aforementioned prior art Co-based alloys nor various other attempts at Co-based alloys have achieved a sufficiently high strength at elevated temperatures to continue to be operational over time.

Since conventional gas turbine components and glass fiber forming spinnerets have failed to adequately address this problem of durability during repeated cycles of high-temperature usage, the need to create alloys with enhanced heat, high-temperature fluid resistance, oxidation and molten glass corrosion resistance properties remains.

The present invention aims at providing a Co-based alloy which exhibits enhanced high-temperature strength and increased resistance properties.

OBJECTS AND SUMMARY OF THE INVENTION

Accordingly, it is an object of the present invention to provide a Co-based alloy exhibiting superior high-temperature strength.

It is another object of the present invention to provide a Co-based alloy exhibiting superior high-temperature oxidation resistance, increased high-temperature fluid wear resistance and enhanced molten glass corrosion resistance.

It is a further object of the invention to provide a Co-based alloy able to withstand known thermal effects over time. These and still further objectives are addressed hereinafter.

Briefly stated, the present invention provides a Co-based alloy which contains essentially, in weight percent: from about 0.1 to about 1.2 of C, from about 0.01 to about 2 of at least one of Si and Mn, from about 22 to about 37 of Cr, from about 5 to about 15 of Ni, and from about 0.1 to about 3.5 of Re, the balance being Co and incidental impurities. Additionally, in a plurality of embodiments the alloy may contain at least one group selected from a group of elements normally present in steel alloys consisting of: (a) from about 0.1 to 12 of Ta and Nb, and (b) from about 0.1 to about 10 W and Mo, and (c) from about 0.005 to about 0.1 B and Zr, and (d) from about 0.005 to about 0.1 of at least one of the rare earth elements including Y, and optionally, 0.1 to 5 Hf, to improve molten glass corrosion resistance. According to a feature of the invention there is provided a Co-based alloy comprising, in weight percent, from about 0.1 to about 1.2 of C, from about 0.01 to about 2 of at least one element selected from the group consisting of Si and Mn, from about 22 to about 37 of Cr, from about 5 to about 15 of Ni from about 0.1 to about 3.5 of Re and the balance being Co and incidental impurities.

According to another embodiment of the invention there is provided a Co-based alloy comprising, in weight percent, from about 0.1 to about 1.2 of C, from about 0.01 to about 2 of at least one element selected from the group consisting of Si and Mn, from about 22 to about 37 of Cr, from about 5 to about 15 of Ni, from about 0.1 to about 3.5 of Re, from about 0.1 to about 12 of at least one element selected from the group consisting of Ta and Nb, from about 0,005 to about 0.1 of at least one element selected from the group consisting B and Zr, and balance being Co and incidental impurities.

According to another embodiment of the invention there is provided a Co-based alloy comprising, in weight percent, from about 0.1 to about 1.2 of C from about 0.01 to about 2 of at least one element selected from the group consisting of Si and Mn, from about 22 to about 37 of Cr, from about 5 to about 15 of Ni, from about 0.1 to about 3.5 of Re, from about 0.1 to about 12 of at least one element selected from the group consisting of Ta and Nb, from about 0.005 to about 0.1 of Y and balance being Co and incidental impurities incidental impurities.

According to another embodiment of the invention there is provided a Co-based alloy comprising, in weight percent, from about 0.1 to about 1.2 of C from about 0.01 to about 2 of at least one element selected from the group consisting of Si and Mn, from about 22 to about 37 of Cr, from about 5 to about 15 of Ni, from about 0.1 to about 3.5 of Re, from about 0.1 to about 10 of at least one element selected from the group consisting of W and Mo, from about 0.005 to about 0.1 of at least one element selected from the group consisting B and Zr and balance being Co and incidental impurities.

According to another embodiment of the invention there is provided a Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1to about 3.5 of Re from about 0.1 to about 10 of at least one element selected from the group consisting of W and Mo from about 0.005 to about 0.1 of Y and balance being Co and incidental impurities.

According to another embodiment of the invention there is provided a Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1 to about 3.5 of Re from about 0.1 to about 12 of at least one element selected from the group consisting of Ta and Nb from about 0.005 to about 0.1 of at least one element selected from the group consisting B and Zr from about 0.1 to about 10 of at least one element selected from the group consisting of W and Mo and balance being Co and incidental impurities.

According to another embodiment of the invention there is provided a Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1 to about 3.5 of Re from about 0.1 to about 12 of at least one element selected from the group consisting of Ta and Nb from about 0.01 to about 5 of Hf from about 0.1 to about 10 of at least one element selected from the group consisting of W and Mo and balance being Co and incidental impurities.

Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1 to about 3.5 of Re from about 0.1 to about 12 of at least one element selected from the group consisting of Ta and Nb from about 0.01 to about 5 of Hf from about 0.005 to about 0.1 of at least one of a rare earth elements including Y. and balance being Co and incidental impurities.

According to another embodiment of the invention there is provided a Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1 to about 3.5 of Re from about 0.01 to about 5 of Hf from about 0.005 to about 0.1 of at least one element selected from the group consisting of B and Zr from about 0.1 to about 10 of at least one element selected from the group consisting of W and Mo and balance being Co and incidental impurities.

Co-based alloy comprising, in weight percent, from about 0.1 to about 1.2 of C from about 0.01 to about 2 of at least one element selected from the group consisting of Si and Mn from about 22 to about 37 of Cr from about 5 to about 15 of Ni from about 0.1 to about 3.5 of Re from about 0.01 to about 5 of Hf from about 0.005 to about 0.1 of at least one element selected from the group consisting of B and Zr from about 0.005 to about 0.1 of at least one of a rare earth elements including Y and balance being Co and incidental impurities.

The above, and other objects, features and advantages of the present invention will become apparent from the following description.

DETAILED DESCRIPTION OF THE PREFERRED EMBODIMENTS

The preferred Co-based alloy exhibiting enhanced high-temperature strength and increased resistance of the present invention is composed of the following elements, described hereinafter.

Carbon (C)

C is present in the material as a component of the solid solution to impart strength thereto. C can also be present in the alloy material in a carbide form. The C is added to improve the high-temperature fluid wear resistance of the alloy. It is preferred that C be present in an amount from about 0.1 to about 1.2 wt % (all percentages hereinafter referred to are in weight terms unless otherwise stated).

When present in an amount less than 0.1%, C is unable to impart sufficient high-temperature fluid wear resistance to the alloy material. Alternatively, when the amount of C exceeds 1.2%, C makes the alloy material brittle.

Silicon (Si) and Manganese (Mn)

These components are added to the alloy material in order to effectively deoxidize the molten metal. Si and Mn can be added alone or in combination. The molten metal includes at least one of Si and Mn. The amount of at least one of Si and Mn ranges from about 0.01 to about 2%. When the amount of one of Si and .Mn is less than 0.01%, the molten metal is not sufficiently deoxidized. On the other hand, when the amount of one of Si and Mn exceeds 2%, the molten metal becomes brittle.

Chromium (Cr)

Cr can be present in the alloy material in a carbide form. Its presence substantially improves the high-temperature fluid wear resistance of the alloy material. In order to improve the high-temperature oxidation resistance of the alloy material, Cr can be added to the alloy material as a component of the solid solution.

The amount of Cr preferably ranges from about 22 to about 37%. When present in an amount less than about 22%, Cr fails to secure the desired high-temperature fluid wear resistance. Alternatively, if the amount of Cr exceeds about 37%, Cr reduces the high-temperature strength and toughness of the alloy material.

Nickel (Ni)

Ni is added to the alloy material as a component of the solid solution. Ni serves to improve the oxidation resistance of the alloy material in the presence of Co and Cr while simultaneously increasing the high-temperature strength of the alloy material.

The amount of Ni is preferably between about 5 and about 15%. When present in an amount less than 5%, Ni fails to impart sufficient oxidation resistance to the alloy material. On the other hand, when the amount of Ni exceeds 15%, its effects are negligible.

Rhenium (Re)

When Re is added to the alloy material as a component of the solid solution, it greatly improves the high-temperature strength of the alloy material. This property is further enhanced when Re is added to the alloy material together with Hf.

The amount of Re can range from about 0.1 to about 3.5%. Less than 0.1% does not assure the desired high-temperature strength. More than 3.5% of Re reduces the toughness of the alloy.

Tantalum (Ta) and Niobium (Nb)

The alloy material can also include at least one of Ta and Nb. The addition of at least one of Ta and Nb in the alloy material improves the high-temperature fluid wear resistance of the alloy material. It is preferable to add at least one of Ta and Nb in carbide form.

When added to the alloy material as components of the solid solution, at least one of Ta and Nb greatly improve the high-temperature oxidation resistance and molten glass corrosion resistance of the alloy material.

At least one of Ta and Nb can be added in an amount ranging from about 0.1 to about 12%, because less than 0.1% of one of Ta and Nb does not assure the desired fluid wear resistance effects and because more than about 12% reduces the toughness.

Wolfram (W) and Molybdenum (Mo)

When one of W and Mo is present in the alloy material as a component of the solid solution an improvement in the high-temperature strength of the material.

Although their inclusion is facultative, the presence of these components in carbide form improves the high-temperature fluid wear resistance. The amount of one of W and Mo is preferred to be within a range of from about 0.1 to about 10%, because less than 0.1% does not assure the desired effects and because more than 10% reduces the high temperature oxidation resistance and toughness.

Boron (B) and Zirconium (Zr)

The addition of one of Boron and Zirconium increases the strength of the grain boundary and thus improves the high-temperature strength of the alloy. The amount of these components is preferred to be in range of from about 0.005 to about 0.1%, because less than 0.005% does not sufficiently improve the high-temperature strength and because more than 0.1% reduces the toughness.

Rare earth elements including Yttrium (Y)

Although the addition of at least one of the rare earth elements including Y is also facultative, their addition is advantageous to improve the high-temperature oxidation resistance. The amount of these particular components is limited to a range of from 0.005 to 0.1%. Less than 0.005% is not enough to improve the high-temperature oxidation resistance. More than 0.1% deteriorates castability and workability.

Hafnium (Hf)

When Hf is present in carbide form it improves the high-temperature fluid wear resistance of the alloy. Hf is present in the material as a component of the solid solution for improving the molten glass corrosion resistance. The amount of Hf is preferred to be added in a range of from about 0.1 to about 5%, because less than 0.1% is not enough to obtain the desired molten glass corrosion resistance and because more than 5% reduces the toughness of the alloy.

Iron (Fe)

The presence of up to about 4% Fe does not affect the characteristics of the resultory alloy at all. As such, Fe may be present in the Co-based alloy according to the present invention as an incidental impurity, especially when dictated by economic necessity.

Examples embodying the Co-based alloy according to the present invention will be described below.

EXAMPLE 1

Molten metals of Co-based alloy No. 1 through Co-based alloy No. 59, whose composition is shown in Table 1 through Table 6, and molten metals of comparative example No. 1 through No. 8, whose composition is shown in Table 7, were prepared by a normal melting method. Each of said molten metals was cast by the lost wax precision casting process to obtain sample materials (round bars having a diameter of 12 mm and a length of 120 mm) for the creep rupture test which evaluates high-temperature strength; sample materials (round bars having a diameter of 12 mm and a length of 120 mm) for the high-temperature oxidation resistance test which evaluates high-temperature oxidation resistance; sample materials (round bars having a diameter of 12 mm and a length of 120 mm) for the high-temperature fluid wear test which evaluates high-temperature fluid wear resistance; and sample materials (disks having a diameter of 35 mm and a thickness of 5 mm) for the molten glass nozzle extrusion test which evaluates molten glass corrosion resistance.

Comparative examples No. 1 through No. 8 are the Co-based alloys in which the amount of any of the basic components (marked by an * in Table 7) is not within the range defined by the present invention.

i. THE CREEP RUPTURE TEST

The creep rupture test was conducted, using samples (the diameter of the parallel portion: 6 mm, the length of the parallel portion: 32 mm, the diameter of the chuck [threaded] portion: 12 mm, the entire length: 80 mm) obtained by machining the above-described sample materials, in the atmosphere at a temperature of 1020 degrees Celsius and under a load stress of 8 kg/mm$^2$. After the test, the rupture life (the high-temperature strength) and elongation were measured. The elongation was measured to evaluate the toughness at elevated temperatures.

ii. THE HIGH-TEMPERATURE OXIDATION TEST

The high-temperature oxidation test was performed, using samples (having a diameter of 10 mm and a height of 12 mm) obtained by machining the above-described sample materials, and by repeating a test cycle, consisting of retention of the sample at 1150 degrees Celsius for 4 hours, cooling of the sample and descaling, eight times. After the test, the weight loss of the tested sample by oxidation was measured to calculate the rate of the weight loss by oxidation relative to the sample's weight obtained before the test.

iii. THE HIGH-TEMPERATURE FLUID WEAR TEST

The high-temperature fluid wear test was conducted, using samples (having a diameter of 10 mm and a length of 100 mm) obtained by machining the above-described sample materials, by retaining the sample for 48 hours in a tube through which a kerosene burning gas (temperature :900 degrees Celsius), mixed with alumina powder having an average grain size of 100 micrometers at a rate of 5 g/min, was passing at a flow rate of about 90 m/sec. After the test, the wear depth of the surface of the central portion of the sample which opposed the fluid was measured.

iv. THE MOLTEN GLASS NOZZLE EXTRUSION TEST

To conduct the molten glass nozzle extrusion test, the central portion of each of the above-described sample materials was cut to a thickness of 1 mm, and a hole having a diameter of 0.5 mm was drilled in that thinned portion. A Co-based alloy crucible (having an inner diameter of 20 mm) employing the thus-obtained sample as the bottom plate thereof was prepared, and soda-lime glass containing 3 vol % of WC powder having an average grain size of 5 micrometers was melted in said crucible.

The molten glass was extruded from the hole in the bottom plate of said crucible by the application of 3 atmospheres to the molten glass from above said crucible which was so treated until the molten glass was heated to 1050 degrees Celsius. After the test was performed by continuing such an extrusion of the molten glass for 48 hours, the diameter of the hole was measured. The rate of change in the hole diameter, e.g., (the hole diameter before the test subtracted from the hole diameter measured after the test divided by the hole diameter obtained before the test multiplied by 100% ), was calculated from the results of the measurements. The results of the calculations are shown in Table 8 through Table 11.

SECOND SET OF EXAMPLES OF THE PRESENT INVENTION

Molten metals of Co-based alloy No. 60 through Co-based alloy No. 120, whose compositions are shown in Tables 12 through 17, and molten metals of comparative examples No. 9 through No. 17, whose compositions are shown in Table 18, were prepared by a known melting method. Next, each of the molten metals was cast by the lost wax precision casting process to obtain; sample materials (round bars having a diameter of 12 mm and a length of 120 mm) for the creep rupture test which evaluates high-temperature strength, sample materials (round bars having a diameter of 12 mm and a length of 120 mm) for the high temperature oxidation test which evaluates high temperature oxidation resistance, sample materials (round bars having a diameter of 12 mm and a length of 120 mm) for the high temperature fluid wear test, which evaluates high temperature fluid wear resistance, and sample materials (disks having a diameter of 35 mm and a thickness of 5 mm) for the molten glass nozzle extrusion test which evaluates molten glass corrosion resistance.

Comparative examples No. 9 through No. 17 are the Co-based alloys in which the amount of any of the basic components (marked by an * in Table 18), as previously discussed and hereinafter specifically differentiated from the claimed subject matter, is not within the range defined by the present invention.

i. THE CREEP RUPTURE TEST

The creep rupture test was conducted, using samples (the diameter of the parallel portion: 6 mm, the length of the parallel portion: 32 mm, the diameter of the chuck [threaded] portion; 12 mm, the entire length: 80 mm) obtained by machining the above-described sample materials, at atmospheric pressure at 950 degrees Celsius and under a load stress of 12 kg/mm$^2$. After the test, the rupture life (the high-temperature strength) and elongation were measured. The elongation was measured to evaluate toughness at elevated temperatures.

ii. THE HIGH-TEMPERATURE OXIDATION TEST

The high-temperature oxidation test was performed, using samples (having a diameter of 10 mm and a height of 12 mm) obtained by machining the above-described sample materials, by repeating a test cycle, consisting of retention of the sample at 1125 degrees Celsius for 12 hours, cooling of the sample and alescaling, five times. After the test, the weight loss of the tested sample by oxidation was measured to calculate the rate of the weight loss by oxidation relative to the sample's weight obtained before the test.

iii. THE HIGH-TEMPERATURE FLUID WEAR TEST

The high temperature fluid wear test was conducted, using samples (having a diameter of 10 mm and a length of 100 mm) obtained by machining the above-described sample materials, by retaining the sample for 48 hours in a tube through which a kerosene burning gas (temperature :900 C.), mixed with alumina powder having an average grain size of 100 micrometers at a rate of 5 g/min, was passing at a flow rate of about 90 m/sec. After the test, the wear depth of the surface of the central portion of the sample which opposed the fluid was measured.

iv. THE MOLTEN GLASS EXTRUSION TEST

To conduct the molten glass nozzle extrusion test, the central portion of each of the above-described sample materials was cut to a thickness of 1 mm, and a hole having a diameter of 0.5 mm was drilled in that thinned portion. A Co-based alloy crucible (having an inner diameter of 20 mm) employing the thus-obtained sample as the bottom plate thereof was prepared, and soda-lime glass containing 3 vol % of WC powder having an average grain size of 5 micrometers was melted in said crucible at atmospheric pressure. The molten glass was extruded from the hole in the bottom plate of said crucible by the application of 3 atmospheres to the molten glass from above said crucible which was conducted in a state wherein the molten glass was heated to 1050 degrees Celsius. After the test was performed by continuing such an extrusion of the molten glass for 48 hours, the diameter of the hole was measured. The rate of change in the hole diameter was calculated from the results of the measurements, as recited above. The results of the calculations are shown in Table 19 through Table 22.

It is clear from the test results shown in Tables 1 through 22, that Co-based alloy No. 1 through Co-based alloy No. 120 of the present invention exhibit enhanced high-temperature strength, excellent high-temperature toughness, increased high temperature oxidation resistance, enhanced high-temperature fluid wear resistance and increased molten glass corrosion resistance. These findings are emphasized by comparative examples No. 1 through No. 17 which compare less favorably in each of the tested parameters because the amount of at least one of the components thereof is out of the range defined by the claims of the present invention.

As discussed above, the Co-based alloy of the present invention exhibits superior high-temperature strength, superior high-temperature toughness, increased high temperature oxidation resistance, enhanced high temperature fluid wear resistance and increased molten glass corrosion resistance. Accordingly, the use of the Co-based alloy of the present invention in manufacturing articles such as gas turbine components and glass fiber forming spinnerets, the products produced shall be able to perform over longer periods of time even when used under demanding high-temperature conditions.

Having described preferred embodiments of the present invention, it is to be understood that the invention in not limited to those precise embodiments, and that various changes and modifications may be effected by one skilled in the art without departing from the scope or spirit of the invention as defined by the appended claims.

TABLE 1

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| | Co-BASED ALLOY ACCORDING TO THE PRESENT INVENTION | | | | | | | |
| 1 | 0.11 | 0.16 | — | 27.3 | 6.7 | 0.92 | — | Bal. |
| 2 | 0.58 | 0.31 | 0.25 | 27.5 | 6.5 | 0.76 | — | Bal. |
| 3 | 1.19 | — | 1.21 | 28.2 | 7.3 | 0.81 | — | Bal. |
| 4 | 0.62 | 0.02 | 0.03 | 22.1 | 10.4 | 0.75 | — | Bal. |
| 5 | 0.63 | 0.11 | 0.66 | 36.6 | 12.7 | 0.90 | — | Bal. |

TABLE 1-continued

| | COMPOSITION (Wt %) | | | | | | |
|---|---|---|---|---|---|---|---|
| TYPE | C | Si | Mn | Cr | Ni | Re | SELECTED COMPONENT | Co + INCIDENTAL IMPURITIES |
| 6 | 0.56 | — | 0.87 | 25.9 | 5.1 | 1.06 | — | Bal. |
| 7 | 0.58 | 0.22 | 0.59 | 25.8 | 14.7 | 1.09 | — | Bal. |
| 8 | 0.56 | — | 0.75 | 26.4 | 10.8 | 0.11 | — | Bal. |

TABLE 2

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| Co-BASED ALLOY ACCORDING TO THE PRESENT INVENTION | | | | | | | | |
| 9 | 0.57 | 0.15 | 0.49 | 27.4 | 9.7 | 3.44 | — | Bal. |
| 10 | 0.55 | — | 0.44 | 29.3 | 9.5 | 1.16 | Ta: 0.12 | Bal. |
| 11 | 0.61 | 0.18 | 0.67 | 29.1 | 10.4 | 1.03 | Nb: 6.2 | Bal. |
| 12 | 0.60 | 0.37 | — | 29.8 | 11.4 | 1.26 | Ta: 5.8, Nb: 5.4 | Bal. |
| 13 | 0.63 | 0.53 | 0.72 | 26.9 | 9.9 | 1.24 | W: 4.8 | Bal. |
| 14 | 0.62 | 0.29 | 0.39 | 27.9 | 8.2 | 1.05 | Mo: 5.1, Fe: 3.2 | Bal. |
| 15 | 0.60 | — | 0.42 | 26.4 | 8.8 | 1.09 | W: 7.8, Mo: 2.1 | Bal. |
| 16 | 0.59 | 0.41 | 0.24 | 25.1 | 9.8 | 1.13 | B: 0.006 | Bal. |
| 17 | 0.58 | 0.22 | — | 26.6 | 10.1 | 0.90 | Zr: 0.04 | Bal. |
| 18 | 0.63 | 0.15 | 0.11 | 27.0 | 9.3 | 0.98 | B: 0.02, Zr: 0.06 | Bal. |

TABLE 3

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| Co-BASED ALLOY ACCORDING TO THE PRESENT INVENTION | | | | | | | | |
| 19 | 0.66 | 0.12 | 0.22 | 31.7 | 10.2 | 0.91 | Ce: 0.006 | Bal. |
| 20 | 0.63 | — | 0.48 | 30.4 | 9.9 | 0.96 | La: 0.04, Fe: 2.8 | Bal. |
| 21 | 0.57 | 0.27 | 0.50 | 31.5 | 8.8 | 1.07 | Ce: 0.01, La: 0.08 | Bal. |
| 22 | 0.57 | 0.35 | — | 32.2 | 10.0 | 1.08 | Ta: 5.2, Nb: 1.2, Mo: 2.3 | Bal. |
| 23 | 0.61 | 0.12 | 0.46 | 30.3 | 10.6 | 1.08 | Nb: 4.1, Mo: 3.0, W: 5.1 | Bal. |
| 24 | 0.59 | 0.12 | 0.46 | 30.2 | 11.8 | 0.91 | Ta: 5.2, Nb: 2.2, W: 4.6, Mo: 2.0 | Bal. |
| 25 | 0.63 | — | 0.52 | 31.8 | 10.6 | 0.90 | Nb: 1.6, Zr: 0.04 | Bal. |
| 26 | 0.64 | 0.11 | — | 31.3 | 10.1 | 0.99 | Ta: 6.1, Nb: 0.7, B: 0.01 | Bal. |
| 27 | 0.69 | 0.15 | 0.08 | 30.6 | 9.4 | 1.00 | Ta: 4.4, B: 0.01, Zr: 0.03 | Bal. |
| 28 | 0.78 | — | 0.12 | 30.9 | 10.3 | 1.18 | Ta: 4.7, Nb: 0.9, Ce: 0.05 | Bal. |

TABLE 4

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| Co-BASED ALLOY ACCORDING TO THE PRESENT INVENTION | | | | | | | | |
| 29 | 0.62 | 0.10 | 0.11 | 29.8 | 10.6 | 1.02 | Ta: 4.1, Ce: 0.02, Nd: 0.02 | Bal. |
| 30 | 0.58 | 0.25 | — | 29.8 | 11.4 | 0.94 | Ta: 5.1, Nb: 1.6, Nd: 0.02, Pr: 0.02, La: 0.02 | Bal. |
| 31 | 0.57 | 0.41 | 0.22 | 27.1 | 11.2 | 0.85 | Mo: 2.4, B: 0.02, Zr: 0.07 | Bal. |
| 32 | 0.59 | — | 0.28 | 28.1 | 10.2 | 0.88 | W: 7.1, Mo: 0.8, B: 0.02 | Bal. |
| 33 | 0.61 | 0.25 | 0.26 | 26.3 | 9.9 | 1.03 | W: 6.1, Mo: 1.1, B: 0.01, Zr: 0.05 | Bal. |
| 34 | 0.57 | 0.34 | — | 30.4 | 9.8 | 1.07 | W: 2.0, Mo: 1.8, La: 0.05 | Bal. |
| 35 | 0.62 | 0.36 | 0.44 | 30.7 | 10.7 | 1.12 | Mo: 1.9, Nd: 0.01, Pr: 0.01 | Bal. |
| 36 | 0.64 | — | 0.43 | 31.6 | 11.2 | 0.98 | W: 4.7, Mo: 2.3, Ce: 0.04, La: 0.02 | Bal. |
| 37 | 0.57 | 0.20 | — | 31.1 | 10.4 | 0.78 | B: 0.02, Ce: 0.07 | Bal. |
| 38 | 0.56 | 0.13 | 0.45 | 30.4 | 10.5 | 1.04 | Zr: 0.07, Ce: 0.01, La: 0.02 | Bal. |

TABLE 5

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| Co-BASED ALLOY ACCORDING TO THE PRESENT INVENTION | | | | | | | | |
| 39 | 0.59 | 0.08 | 0.27 | 29.5 | 9.4 | 1.12 | B: 0.01, Zr: 0.04, Ce: 0.01, Nd: 0.02, Pr: 0.01 | Bal. |
| 40 | 0.63 | 0.01 | 0.28 | 27.6 | 7.1 | 0.98 | Mo: 2.5, B: 0.02 | Bal. |
| 41 | 0.59 | 0.29 | 0.44 | 27.3 | 8.0 | 0.96 | W: 4.2, B: 0.01, Zr: 0.04 | Bal. |
| 42 | 0.61 | 0.24 | 0.41 | 26.1 | 7.0 | 0.94 | W: 0.5, Mo: 2.7, B: 0.01, Zr: 0.03 | Bal. |
| 43 | 0.63 | 0.18 | 0.46 | 29.0 | 9.7 | 0.91 | W: 5.7, MO: 2.0, Ce: 0.07 | Bal. |

TABLE 5-continued

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| 44 | 0.63 | 0.29 | 0.28 | 31.3 | 9.2 | 0.85 | W: 4.5, La: 0.04, Ce: 0.01 | Bal. |
| 45 | 0.58 | 0.35 | 0.31 | 31.2 | 10.8 | 0.88 | W: 2.6, Mo: 1.9, La: 0.04, Nd: 0.02, Pr: 0.01 | Bal. |
| 46 | 0.66 | 0.20 | 0.38 | 30.2 | 10.7 | 0.55 | B: 0.02, Nd: 0.06, Pr: 0.01 | Bal. |
| 47 | 0.65 | 0.28 | 0.42 | 29.5 | 9.9 | 1.00 | Zr: 0.05, Ce: 0.02 | Bal. |
| 48 | 0.62 | 0.27 | 0.33 | 30.2 | 9.8 | 1.05 | B: 0.01, Zr: 0.04, La: 0.03 | Bal. |

TABLE 6

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| | Co-BASED ALLOY ACCORDING TO THE PRESENT INVENTION | | | | | | | |
| 49 | 0.58 | — | 0.23 | 29.5 | 11.4 | 0.88 | W: 4.3, Zr: 0.04, La: 0.02, Ce: 0.02 | Bal. |
| 50 | 0.66 | 0.20 | 0.24 | 31.0 | 10.6 | 0.90 | Mo: 3.4, B: 0.02, Zr: 0.03, La: 0.05 | Bal. |
| 51 | 0.62 | 0.18 | — | 29.9 | 9.4 | 1.09 | W: 5.2, Mo: 0.6, Zr: 0.04, Nd: 0.01, Pr: 0.02, Ce: 0.02 | Bal. |
| 52 | 0.60 | 0.18 | 0.70 | 30.8 | 10.3 | 1.06 | Ta: 4.2, W: 2.5, Mo: 1.0, Zr: 0.05, Ce: 0.02 | Bal. |
| 53 | 0.51 | — | 0.69 | 30.7 | 10.3 | 0.92 | Nb: 2.4, W: 4.0, Ce: 0.03, La: 0.01, Nd: 0.01, Pr: 0.01 | Bal. |
| 54 | 0.57 | 0.06 | 0.51 | 31.0 | 9.0 | 0.95 | Ta: 5.2, Nd: 0.3, W: 0.9, Mo: 1.4, La: 0.01, Ce: 0.01 | Bal. |
| 55 | 0.57 | 0.41 | 0.25 | 30.1 | 10.6 | 1.04 | Y: 0.05 | Bal. |
| 56 | 0.69 | 0.25 | 0.88 | 30.7 | 8.9 | 0.96 | Ta: 0.5, Nb: 1.8, Y: 0.04, La: 0.02 | Bal. |
| 57 | 0.64 | 0.29 | 0.47 | 31.0 | 9.6 | 1.14 | W: 4.1, Y: 0.08 | Bal. |
| 58 | 0.41 | — | 0.55 | 29.8 | 9.8 | 0.89 | B: 0.02, Zr: 0.04, Y: 0.04, Nd: 0.01 | Bal. |
| 59 | 0.58 | 0.32 | 0.76 | 30.4 | 9.5 | 0.87 | Ta: 2.5, W: 3.2, Mo: 0.8, B: 0.01, Y: 0.06 | Bal. |

TABLE 7

| | COMPOSITION (Wt %) | | | | | | | |
|---|---|---|---|---|---|---|---|---|
| TYPE | C | Si | Mn | Cr | Ni | Re | SELECTED COMPONENT | Co + INCIDENTAL IMPURITIES |
| | Co-BASED ALLOY OF COMPARATIVE EXAMPLE | | | | | | | |
| 1 | 0.04* | 0.08 | 0.29 | 27.7 | 10.4 | 1.03 | — | Bal. |
| 2 | 0.48* | 0.11 | 0.43 | 29.1 | 9.7 | 1.14 | — | Bal. |
| 3 | 0.61 | 1.21* | 0.28* | 28.4 | 9.9 | 0.99 | — | Bal. |
| 4 | 0.57 | 0.22 | — | 20.0* | 10.1 | 0.93 | — | Bal. |
| 5 | 0.59 | 0.14 | 0.41 | 41.3* | 11.4 | 1.08 | — | Bal. |
| 6 | 0.66 | — | 0.35 | 28.5 | 3.86* | 1.04 | — | Bal. |
| 7 | 0.58 | 0.16 | 0.30 | 28.1 | 9.3 | —* | — | Bal. |
| 8 | 0.61 | 0.18 | 0.42 | 27.8 | 10.5 | 4.08* | — | Bal. |

TABLE 8

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| | Co-BASED ALLOY ACCORDING TO THE PRESENT INVENTION | | | | |
| 1 | 92 | 5.5 | 0.44 | 0.9 | 4.0 |
| 2 | 92 | 3.8 | 0.47 | 0.7 | 3.3 |
| 3 | 101 | 2.7 | 0.48 | 0.5 | 2.4 |
| 4 | 96 | 10.4 | 0.56 | 0.8 | 3.6 |
| 5 | 91 | 3.0 | 0.33 | 0.5 | 2.5 |
| 6 | 89 | 8.3 | 0.47 | 0.8 | 3.2 |
| 7 | 100 | 5.6 | 0.54 | 0.7 | 2.5 |
| 8 | 95 | 10.1 | 0.46 | 0.7 | 3.1 |
| 9 | 110 | 4.0 | 0.44 | 0.8 | 3.8 |
| 10 | 97 | 6.4 | 0.41 | 0.5 | 2.8 |
| 11 | 96 | 5.5 | 0.34 | 0.4 | 2.0 |
| 12 | 87 | 4.6 | 0.39 | 0.4 | 2.1 |
| 13 | 109 | 5.9 | 0.43 | 0.5 | 2.3 |
| 14 | 108 | 6.3 | 0.48 | 0.3 | 2.3 |

TABLE 8-continued

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| 15 | 102 | 5.1 | 0.45 | 0.3 | 2.5 |
| 16 | 104 | 7.8 | 0.44 | 0.5 | 3.6 |
| 17 | 107 | 7.0 | 0.44 | 0.6 | 3.8 |

TABLE 9

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| | Co-BASED ALLOY ACCORDING TO THE PRESENT INVENTION | | | | |
| 18 | 109 | 8.8 | 0.49 | 0.6 | 3.9 |
| 19 | 91 | 5.6 | 0.34 | 0.7 | 4.2 |
| 20 | 90 | 5.3 | 0.37 | 0.8 | 3.5 |
| 21 | 87 | 9.4 | 0.33 | 0.8 | 3.7 |
| 22 | 99 | 4.0 | 0.38 | 0.4 | 2.1 |
| 23 | 107 | 4.7 | 0.36 | 0.3 | 2.6 |
| 24 | 98 | 3.5 | 0.40 | 0.4 | 2.5 |
| 25 | 98 | 6.0 | 0.40 | 0.4 | 2.7 |
| 26 | 106 | 6.6 | 0.33 | 0.4 | 2.0 |
| 27 | 108 | 7.3 | 0.32 | 0.5 | 1.9 |
| 28 | 93 | 4.8 | 0.35 | 0.4 | 2.4 |
| 29 | 86 | 5.4 | 0.34 | 0.3 | 1.7 |
| 30 | 87 | 5.9 | 0.33 | 0.3 | 1.8 |
| 31 | 93 | 6.8 | 0.47 | 0.2 | 1.8 |
| 32 | 105 | 3.4 | 0.44 | 0.3 | 1.4 |
| 33 | 96 | 3.8 | 0.47 | 0.3 | 2.1 |
| 34 | 102 | 4.4 | 0.41 | 0.4 | 2.0 |

TABLE 10

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| | Co-BASED ALLOY ACCORDING TO THE PRESENT INVENTION | | | | |
| 35 | 96 | 5.2 | 0.31 | 0.4 | 1.8 |
| 36 | 101 | 5.8 | 0.41 | 0.5 | 2.4 |
| 37 | 103 | 10.0 | 0.32 | 0.8 | 4.2 |
| 38 | 108 | 11.2 | 0.35 | 0.9 | 4.0 |
| 39 | 110 | 8.4 | 0.36 | 0.7 | 3.3 |
| 40 | 95 | 7.9 | 0.45 | 0.6 | 1.9 |
| 41 | 104 | 6.7 | 0.41 | 0.5 | 1.8 |
| 42 | 103 | 6.8 | 0.42 | 0.3 | 2.3 |
| 43 | 107 | 5.6 | 0.38 | 0.4 | 2.4 |
| 44 | 96 | 5.3 | 0.35 | 0.4 | 1.7 |
| 45 | 105 | 4.7 | 0.38 | 0.3 | 2.5 |
| 46 | 101 | 9.2 | 0.34 | 0.6 | 4.0 |
| 47 | 102 | 8.9 | 0.31 | 0.7 | 3.5 |
| 48 | 94 | 8.4 | 0.33 | 0.7 | 3.7 |
| 49 | 96 | 6.1 | 0.32 | 0.4 | 1.7 |
| 50 | 102 | 5.9 | 0.31 | 0.4 | 2.5 |
| 51 | 101 | 5.8 | 0.28 | 0.3 | 2.2 |

TABLE 11

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| | Co-BASED ALLOY ACCORDING TO THE PRESENT INVENTION | | | | |
| 52 | 103 | 4.4 | 0.35 | 0.3 | 1.6 |
| 53 | 96 | 4.8 | 0.28 | 0.4 | 2.0 |
| 54 | 102 | 5.0 | 0.34 | 0.3 | 1.7 |

TABLE 11-continued

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| 55 | 91 | 2.9 | 0.31 | 0.9 | 3.6 |
| 56 | 94 | 5.8 | 0.32 | 0.4 | 2.1 |
| 57 | 104 | 5.3 | 0.37 | 0.4 | 2.1 |
| 58 | 102 | 6.7 | 0.32 | 0.8 | 3.6 |
| 59 | 107 | 8.4 | 0.34 | 0.4 | 2.4 |
| Co-BASED ALLOY OF COMPARATIVE EXAMPLE | | | | | |
| 1 | 39 | 11.0 | 0.49 | 2.8 | 6.4 |
| 2 | 37 | 0.8 | 0.44 | 0.7 | 2.4 |
| 3 | 32 | 0.4 | 0.48 | 0.9 | 2.9 |
| 4 | 84 | 9.2 | 0.81 | 1.2 | 4.5 |
| 5 | 58 | 1.2 | 0.30 | 0.6 | 3.2 |
| 6 | 46 | 10.3 | 0.45 | 0.5 | 3.6 |
| 7 | 66 | 6 | 0.42 | 0.7 | 3.8 |
| 8 | 99 | 0.5 | 0.41 | 0.7 | 3.2 |

TABLE 12

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 60 | 0.12 | 0.32 | — | 28.2 | 10.2 | 1.15 | 0.72 | — | Bal. |
| 61 | 0.63 | 0.15 | 0.30 | 27.6 | 9.8 | 1.26 | 0.93 | — | Bal. |
| 62 | 1.17 | — | 1.04 | 27.3 | 9.6 | 0.88 | 1.06 | — | Bal. |
| 63 | 0.53 | 0.01 | 0.08 | 22.3 | 9.3 | 1.06 | 1.08 | — | Bal. |
| 64 | 0.59 | 0.15 | 0.71 | 36.8 | 8.5 | 2.02 | 1.06 | — | Bal. |
| 65 | 0.60 | — | 0.63 | 25.9 | 5.2 | 0.92 | 1.12 | — | Bal. |
| 66 | 0.61 | 0.88 | 0.26 | 32.0 | 14.9 | 2.05 | 1.11 | — | Bal. |
| 67 | 0.56 | 0.66 | — | 30.1 | 10.8 | 0.13 | 1.32 | — | Bal. |
| 68 | 0.61 | 0.13 | 0.22 | 32.3 | 8.4 | 4.84 | 1.05 | — | Bal. |
| 69 | 0.55 | — | 0.76 | 26.2 | 9.1 | 1.86 | 0.12 | — | Bal. |

TABLE 13

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 70 | 0.54 | 0.26 | 0.08 | 29.1 | 10.0 | 0.96 | 3.46 | — | Bal. |
| 71 | 0.54 | — | 0.68 | 30.6 | 9.2 | 1.07 | 0.77 | Ta: 0.15 | Bal. |
| 72 | 0.55 | 0.24 | 0.24 | 29.4 | 8.1 | 1.71 | 0.78 | Nb: 5.3 | Bal. |
| 73 | 0.53 | 0.56 | — | 32.2 | 10.2 | 1.78 | 0.78 | Ta: 4.1, Nb: 6.8 | Bal. |
| 74 | 0.61 | 0.31 | 0.41 | 27.4 | 8.9 | 1.08 | 2.11 | W: 3.4 | Bal. |
| 75 | 0.61 | 0.22 | 0.42 | 29.6 | 11.7 | 1.45 | 2.02 | Mo: 4.2, Fe: 3.5 | Bal. |
| 76 | 0.58 | — | 1.03 | 27.7 | 10.8 | 1.46 | 2.43 | W: 3.3, Mo: 1.6 | Bal. |
| 77 | 0.57 | 0.06 | 1.09 | 26.4 | 8.8 | 0.96 | 2.25 | B: 0.07 | Bal. |
| 78 | 0.60 | 0.15 | — | 26.4 | 7.5 | 0.92 | 2.21 | Zr: 0.04 | Bal. |
| 79 | 0.52 | 0.15 | 0.45 | 26.8 | 9.1 | 1.09 | 2.26 | B: 0.01, Zr: 0.08 | Bal. |

TABLE 14

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 80 | 0.57 | 0.13 | 0.15 | 32.7 | 8.9 | 1.44 | 1.10 | Ce: 0.01 | Bal. |
| 81 | 0.67 | — | 0.33 | 30.0 | 9.7 | 1.19 | 1.07 | La: 0.05; Fe: 2.0 | Bal. |
| 82 | 0.64 | 0.12 | 0.32 | 31.1 | 10.2 | 1.28 | 1.09 | Ce: 0.04, La: 0.01 | Bal. |
| 83 | 0.58 | 0.25 | — | 27.6 | 12.6 | 0.72 | 0.78 | Ta: 7.2, Nb: 1.0, Mo: 2.3 | Bal. |
| 84 | 0.55 | 0.34 | 0.35 | 28.2 | 12.3 | 0.73 | 0.75 | Nb: 4.0, Mo: 1.0, W: 4.5 | Bal. |
| 85 | 0.60 | 0.18 | 0.40 | 29.3 | 11.5 | 0.92 | 0.72 | Ta: 5.0, Nb: 1.1, W: 4.2, Mo: 1.3 | Bal. |
| 86 | 0.61 | — | 0.17 | 31.5 | 10.4 | 0.91 | 0.36 | Nb: 1.7, Zr: 0.08 | Bal. |
| 87 | 0.62 | 0.42 | — | 30.6 | 9.4 | 0.97 | 0.45 | Ta: 4.2, Nb: 1.6, B: 0.02 | Bal. |
| 88 | 0.63 | 0.41 | 0.34 | 30.2 | 9.8 | 0.73 | 0.42 | Ta: 5.6, B: 0.02, Zr: 0.04 | Bal. |
| 89 | 0.64 | — | 0.30 | 28.4 | 9.2 | 1.16 | 0.43 | Ta: 5.5, Nb: 1.7, Ce: 0.007 | Bal. |

TABLE 15

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 90 | 0.61 | 0.16 | 0.65 | 31.7 | 9.1 | 1.42 | 1.74 | Ta: 4.0, Ce: 0.01, Nd: 0.05 | Bal. |
| 91 | 0.57 | 0.15 | — | 31.3 | 9.5 | 1.36 | 1.78 | Ta: 3.8, Nb: 0.02, Nd: 0.05, Pr: 0.01, La: 0.01 | Bal. |
| 92 | 0.53 | 0.12 | 0.22 | 25.5 | 12.7 | 1.33 | 1.66 | Mo: 2.1, B: 0.01, Zr: 0.05 | Bal. |
| 93 | 0.56 | — | 0.50 | 26.9 | 13.3 | 0.95 | 1.75 | W: 4.0, Mo: 4.2, B: 0.02 | Bal. |
| 94 | 0.50 | 0.23 | 0.53 | 26.0 | 12.0 | 0.88 | 1.58 | W: 4.5, Mo: 1.0, B: 0.02, Zr: 0.04 | Bal. |
| 95 | 0.67 | 0.15 | — | 27.3 | 12.6 | 0.88 | 1.53 | W: 2.7, Mo: 2.3, La: 0.005 | Bal. |
| 96 | 0.59 | 0.26 | 0.56 | 30.5 | 11.3 | 1.55 | 1.59 | Mo: 1.8, Nd: 0.01, Pr: 0.005 | Bal. |
| 97 | 0.68 | — | 0.61 | 31.4 | 11.0 | 1.17 | 1.66 | W: 4.7, Mo: 0.8, Ce: 0.005, La: 0.015 | Bal. |
| 98 | 0.65 | 0.20 | — | 30.7 | 12.2 | 0.91 | 1.58 | B: 0.01, Ce: 0.02 | Bal. |
| 99 | 0.62 | 0.04 | 0.14 | 29.5 | 12.9 | 0.90 | 1.71 | Zr: 0.07, Ce: 0.01, La: 0.04 | Bal. |

TABLE 16

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 100 | 0.53 | 0.14 | 0.28 | 30.3 | 8.5 | 0.84 | 0.86 | B: 0.01, Zr: 0.08, Ce: 0.001, Nd: 0.002, Pr: 0.01 | Bal. |
| 101 | 0.41 | 0.09 | 0.35 | 27.4 | 9.1 | 0.85 | 1.14 | Mo: 4.2, B: 0.008 | Bal. |
| 102 | 0.48 | 0.11 | 0.31 | 27.3 | 8.6 | 0.88 | 0.99 | W: 6.1, B: 0.005, Zr: 0.04 | Bal. |
| 103 | 0.51 | 0.43 | 0.25 | 27.9 | 9.3 | 0.82 | 1.03 | W: 6.5, Mo: 2.1, B: 0.01, Zr: 0.03 | Bal. |
| 104 | 0.56 | 0.57 | 0.30 | 29.4 | 9.2 | 0.90 | 0.81 | W: 4.1, Mo: 2.0, Ce: 0.02 | Bal. |
| 105 | 0.53 | 0.52 | 0.25 | 29.8 | 9.9 | 0.84 | 0.95 | W: 1.8, La: 0.06, Ce: 0.02 | Bal. |
| 106 | 0.60 | 0.41 | 0.26 | 28.8 | 8.6 | 0.95 | 0.90 | W: 2.4, Mo: 1.2, La: 0.01, Nd: 0.01, Pr: 0.005 | Bal. |
| 107 | 0.62 | 0.43 | 0.34 | 28.5 | 11.0 | 0.71 | 3.02 | B: 0.02, Nd: 0.01, Pr: 0.01 | Bal. |
| 108 | 0.62 | 0.51 | 0.29 | 29.7 | 10.4 | 1.08 | 2.89 | Zr: 0.05, Ce: 0.03 | Bal. |
| 109 | 0.56 | 0.11 | 0.31 | 30.6 | 9.9 | 1.04 | 2.03 | B: 0.01, Zr: 0.08, La: 0.08 | Bal. |

TABLE 17

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY ACCORDING TO THE PRESENT INVENTION | | | | | | | | | |
| 110 | 0.58 | — | 0.27 | 31.0 | 8.9 | 1.28 | 0.85 | W: 6.8, Zr: 0.04, Ln: 0.02, Ce: 1.01 | Bal. |
| 111 | 0.59 | 0.20 | 0.28 | 30.3 | 9.2 | 1.21 | 0.70 | Mo: 3.1, B: 0.03, Zr: 0.01, La: 0.05 | Bal. |
| 112 | 0.62 | 0.14 | — | 29.4 | 8.8 | 1.27 | 0.94 | W: 7.1, Mo: 0.1, Zr: 0.02, Nd: 0.01, Pr: 0.02, Ce: 0.005 | Bal. |
| 113 | 0.58 | 0.09 | 0.25 | 29.1 | 10.0 | 1.34 | 1.26 | Ta: 5.8, W: 2.6, Mo: 2.0, Zr: 0.03, Ce: 0.04 | Bal. |
| 114 | 0.51 | — | 0.27 | 30.1 | 10.5 | 1.28 | 1.09 | Nb: 2.7, W: 2.9, Ce: 0.03 La: 0.01, Nd: 0.01, Pr: 0.002 | Bal. |
| 115 | 0.53 | 0.10 | 0.45 | 29.2 | 10.1 | 1.36 | 1.06 | Ta: 4.5, Nb: 4.5, W: 1.9, Mo: 1.2, La: 0.02, Ce: 0.01 | Bal. |
| 116 | 0.61 | 0.23 | 0.31 | 30.8 | 8.9 | 1.41 | 1.05 | Y: 0.08 | Bal. |
| 117 | 0.48 | 0.08 | 0.60 | 31.6 | 7.7 | 0.95 | 0.81 | Ta: 3.0, Nb: 0.7, Y: 0.07 | Bal. |
| 118 | 0.54 | — | 0.59 | 32.2 | 9.9 | 1.28 | 0.96 | W: 4.1 , Y: 0.08 | Bal. |
| 119 | 0.60 | 0.21 | 0.44 | 31.5 | 8.6 | 0.89 | 1.08 | B: 0.01, Zr: 0.04, Y: 0.06 | Bal. |
| 120 | 0.54 | 0.18 | 0.25 | 30.7 | 9.5 | 0.93 | 0.86 | W: 2.6, Mo: 1.8, B: 0.02, Y: 0.06, La: 0.01 | Bal. |

TABLE 18

| | COMPOSITION (Wt %) | | | | | | | | |
|---|---|---|---|---|---|---|---|---|---|
| TYPE | C | Si | Mn | Cr | Ni | Hf | Re | SELECTED COMPONENT | Co + INCIDENTAL IMPURITIES |
| Co-BASED ALLOY OF COMPARATIVE EXAMPLE | | | | | | | | | |
| 9 | 0.03* | 0.72 | 0.61 | 31.6 | 6.8 | 1.40 | 0.65 | — | Bal. |
| 10 | 1.43* | 0.34 | 0.10 | 28.7 | 11.6 | 0.78 | 0.94 | — | Bal. |
| 11 | 0.81 | 1.03* | 1.42* | 29.6 | 10.4 | 1.29 | 0.84 | — | Bal. |
| 12 | 0.60 | 0.23 | — | 19.6* | 10.7 | 2.30 | 1.20 | — | Bal. |
| 13 | 0.57 | 0.41 | 0.22 | 40.2* | 8.9 | 2.41 | 1.27 | — | Bal. |
| 14 | 0.41 | — | 0.60 | 30.8 | 3.14* | 0.99 | 0.80 | — | Bal. |

TABLE 18-continued

| | COMPOSITION (Wt %) | | | | | | | |
|---|---|---|---|---|---|---|---|---|
| TYPE | C | Si | Mn | Cr | Ni | Hf | Re | SELECTED COMPONENT | Co + INCIDENTAL IMPURITIES |
| 15 | 0.54 | 0.41 | — | 31.0 | 10.7 | 6.04* | 0.97 | — | Bal. |
| 16 | 0.61 | 0.22 | 0.63 | 29.7 | 6.5 | 1.58 | —* | — | Bal. |
| 17 | 0.63 | 0.10 | 0.45 | 28.8 | 7.1 | 2.01 | 4.13* | — | Bal. |

TABLE 19

| | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| TYPE | RUPTURE LIFE (HOUR) | ELONGATION (%) | | | |
| Co-BASED ALLOY ACCORDING TO THE PRESENT INVENTION | | | | | |
| 60 | 160 | 8.6 | 0.47 | 0.8 | 4.2 |
| 61 | 174 | 3.6 | 0.41 | 0.6 | 3.2 |
| 62 | 190 | 3.5 | 0.38 | 0.5 | 2.0 |
| 63 | 169 | 5.9 | 0.40 | 0.8 | 3.5 |
| 64 | 160 | 6.3 | 0.24 | 0.5 | 2.2 |
| 65 | 158 | 6.8 | 0.43 | 0.7 | 2.6 |
| 66 | 188 | 7.8 | 0.30 | 0.7 | 3.2 |
| 67 | 170 | 6.9 | 0.42 | 0.8 | 2.5 |
| 68 | 168 | 8.0 | 0.31 | 0.4 | 1.7 |
| 69 | 163 | 4.2 | 0.41 | 0.9 | 3.7 |
| 70 | 184 | 3.6 | 0.44 | 0.8 | 3.3 |
| 71 | 167 | 7.4 | 0.29 | 0.5 | 2.3 |
| 72 | 164 | 6.8 | 0.25 | 0.3 | 2.0 |
| 73 | 158 | 6.9 | 0.33 | 0.2 | 1.8 |
| 74 | 187 | 4.9 | 0.39 | 0.4 | 2.1 |
| 75 | 184 | 3.8 | 0.48 | 0.4 | 1.8 |
| 76 | 190 | 3.9 | 0.42 | 0.5 | 2.5 |

TABLE 20

| | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| TYPE | RUPTURE LIFE (HOUR) | ELONGATION (%) | | | |
| Co-BASED ALLOY ACCORDING TO THE PRESENT INVENTION | | | | | |
| 77 | 178 | 10.9 | 0.47 | 0.7 | 3.3 |
| 78 | 191 | 8.0 | 0.47 | 0.9 | 4.0 |
| 79 | 190 | 9.2 | 0.48 | 0.8 | 3.8 |
| 80 | 148 | 5.8 | 0.32 | 0.8 | 3.5 |
| 81 | 160 | 5.0 | 0.26 | 0.7 | 3.8 |
| 82 | 159 | 4.3 | 0.31 | 0.8 | 4.4 |
| 83 | 178 | 4.6 | 0.31 | 0.3 | 1.9 |
| 84 | 198 | 4.0 | 0.32 | 0.3 | 1.4 |
| 85 | 177 | 4.5 | 0.26 | 0.2 | 2.1 |
| 86 | 186 | 10.6 | 0.35 | 0.5 | 1.5 |
| 87 | 180 | 8.1 | 0.32 | 0.4 | 2.2 |
| 88 | 189 | 7.9 | 0.27 | 0.4 | 2.3 |
| 89 | 151 | 4.8 | 0.25 | 0.4 | 1.5 |
| 90 | 148 | 6.7 | 0.28 | 0.5 | 1.3 |
| 91 | 160 | 7.0 | 0.31 | 0.4 | 2.0 |
| 92 | 195 | 7.6 | 0.42 | 0.4 | 2.4 |
| 93 | 171 | 5.9 | 0.49 | 0.2 | 2.2 |

TABLE 21

| | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| TYPE | RUPTURE LIFE (HOUR) | ELONGATION (%) | | | |
| Co-BASED ALLOY ACCORDING TO THE PRESENT INVENTION | | | | | |
| 94 | 166 | 5.4 | 0.44 | 0.4 | 2.2 |
| 95 | 185 | 7.1 | 0.27 | 0.2 | 2.3 |
| 96 | 161 | 10.4 | 0.28 | 0.4 | 2.2 |
| 97 | 192 | 5.7 | 0.25 | 0.5 | 1.5 |
| 98 | 180 | 7.9 | 0.32 | 0.7 | 4.2 |
| 99 | 196 | 6.9 | 0.33 | 0.8 | 4.0 |

TABLE 21-continued

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| 100 | 164 | 7.3 | 0.25 | 0.7 | 3.3 |
| 101 | 189 | 8.4 | 0.41 | 0.4 | 2.2 |
| 102 | 177 | 9.0 | 0.45 | 0.2 | 2.1 |
| 103 | 184 | 9.1 | 0.42 | 0.4 | 3.0 |
| 104 | 187 | 7.6 | 0.30 | 0.3 | 2.6 |
| 105 | 187 | 6.5 | 0.32 | 0.4 | 2.8 |
| 106 | 191 | 6.8 | 0.24 | 0.4 | 2.9 |
| 107 | 186 | 5.6 | 0.27 | 0.7 | 3.4 |
| 108 | 180 | 7.1 | 0.30 | 0.8 | 4.0 |
| 109 | 184 | 6.5 | 0.32 | 0.8 | 3.2 |
| 110 | 197 | 7.0 | 0.27 | 0.4 | 2.1 |

TABLE 22

| TYPE | CREEP RUPTURE TEST | | HIGH TEMPERATURE OXIDATION TEST RATE OF WEIGHT LOSS BY OXIDATION (%) | HIGH TEMPERATURE FLUID WEAR TEST WEAR DEPTH (mm) | MOLTEN GLASS NOZZLE JET TEST RATE OF CHANGE IN HOLE DIAMETE (%) |
|---|---|---|---|---|---|
| | RUPTURE LIFE (HOUR) | ELONGATION (%) | | | |
| Co-BASED ALLOY ACCORDING TO THE PRESENT INVENTION | | | | | |
| 111 | 188 | 4.3 | 0.28 | 0.4 | 1.8 |
| 112 | 191 | 5.6 | 0.22 | 0.2 | 2.0 |
| 113 | 194 | 6.3 | 0.25 | 0.2 | 2.1 |
| 114 | 196 | 5.9 | 0.32 | 0.2 | 1.7 |
| 115 | 184 | 7.8 | 0.29 | 0.4 | 2.2 |
| 116 | 161 | 6.8 | 0.27 | 0.8 | 3.1 |
| 117 | 171 | 5.9 | 0.29 | 0.4 | 1.9 |
| 118 | 187 | 5.7 | 0.29 | 0.4 | 2.2 |
| 119 | 186 | 7.1 | 0.26 | 0.7 | 4.0 |
| 120 | 185 | 6.4 | 0.28 | 0.4 | 2.1 |
| Co-BASED ALLOY OF COMPARATIVE EXAMPLE | | | | | |
| 9 | 36 | 17.8 | 0.36 | 2.6 | 6.3 |
| 10 | 39 | 0.3 | 0.44 | 0.6 | 2.6 |
| 11 | 39 | 0.6 | 0.33 | 0.5 | 2.8 |
| 12 | 109 | 15.6 | 0.79 | 1.0 | 3.2 |
| 13 | 30 | 2.1 | 0.24 | 0.6 | 2.7 |
| 14 | 54 | 10.8 | 0.36 | 0.4 | 3.4 |
| 15 | 107 | 0.8 | 0.40 | 0.4 | 2.4 |
| 16 | 33 | 8.8 | 0.33 | 0.8 | 2.5 |
| 17 | 161 | 0.8 | 0.35 | 0.7 | 2.3 |

What is claimed is:

1. A Co-based alloy consisting essentially of, in weight percent:
   from about 0.1 to about 1.2 of C;
   from about 0.01 to about 2 of at least one element selected from the group consisting of Si and Mn;
   from about 22 to about 37 of Cr;
   from about 5 to about 15 of Ni;
   from about 0.1 to about 3.5 of Re; and
   a balance being Co and incidental impurities.

2. The Co-based alloy of claim 1, further comprising:
   from about 0.1 to about 12 of at least one element selected from the group consisting of Ta and Nb.

3. The Co-based alloy of claim 2, further comprising:
   from about 0.1 to about 10 of at least one element selected from the group consisting of W and Mo.

4. The Co-based alloy of claim 1, further comprising:
   from about 0.005 to 0.1 of at least one element selected from the group consisting of B and Zr.

5. The Co-based alloy of claim 1, further comprising:
   from about 0.005 to 0.1 of at least one element selected from the
   group consisting of a rare earth element and Y.

6. A Co-based alloy consisting essentially of, in weight percent:
   from about 0.1 to about 1.2 of C;
   from about 0.01 to about 2 of at least one element selected from the group consisting of Si and Mn;
   from about 22 to about 37 of Cr;
   from about 5 to about 15 of Ni;
   from about 0.1 to about 3.5 of Re;
   from about 0.1 to about 12 of at least one element selected from the group consisting of Ta and Nb;
   from about 0.005 to about 0.1 of at least one element selected from the group consisting B and Zr; and
   a balance being Co and incidental impurities.

7. The Co-based alloy of claim 6, further comprising, in weight percent:
   from about 0.005 to about 0.1 of at least one element selected from the group consisting of a rare earth elements and Y.

8. A Co-based alloy consisting essentially of, in weight percent:
   from about 0.1 to about 1.2 of C;
   from about 0.01 to about 2 of at least one element selected from the group consisting of Si and Mn;
   from about 22 to about 37 of Cr;

from about 5 to about 15 of Ni;
from about 0.1 to about 3.5 of Re;
from about 0.1 to about 12 of at least one element selected from the group consisting of Ta and Nb;
from about 0.005 to about 0.1 of Y; and
a balance being Co and incidental impurities incidental impurities.

9. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 10 of at least one element selected from the group consisting of W and Mo;
from about 0.005 to about 0.1 of at least one element selected from the group consisting B and Zr; and
a balance being Co and incidental impurities.

10. The Co-based alloy of claim 9, further comprising:
from about 0.005 to 0.1 of at least one element selected from the group consisting of a rare earth element and Y.

11. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 10 of at least one element selected from the group consisting of W and Mo;
from about 0.005 to about 0.1 of Y; and
a balance being Co and incidental impurities.

12. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 12 of at least one element selected from the group consisting of Ta and Nb;
from about 0.005 to about 0.1 of at least one element selected from the group consisting B and Zr;
from about 0.1 to about 10 of at least one element selected from the group consisting of W and Mo; and
a balance being Co and incidental impurities.

13. The Co-based alloy of claim 12, further including:
from about 0.005 to about 0.1 of at least one element selected from the group consisting of a rare earth elements and Y.

14. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 5 Hf; and
a balance being Co and incidental impurities.

15. The Co-based alloy of claim 14, further comprising:
from about 0.1 to about 12 of at least one element selected from the group consisting of Ta and Nb.

16. The Co-based alloy of claim 14, further comprising:
from about 0.1 to about 10 of at least one element selected from the group consisting of W and Mo.

17. The Co-based alloy of claim 14, further comprising:
from about 0.005 to about 0.1 of at least one element selected from the group consisting of a rare earth elements and Y.

18. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 12 of at least one element selected from the group consisting of Ta and Nb;
from about 0.1 to about 5 of Hf;
from about 0.1 to about 10 of at least one element selected from the group consisting of W and Mo; and
a balance being Co and incidental impurities.

19. The Co-based alloy of claim 18, further comprising:
from about 0.005 to 0.1 of at least one element selected from the group consisting of a rare earth element and Y.

20. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 12 of at least one element selected from the group consisting of Ta and Nb;
from about 0.1 to about 5 of Hf;
from about 0.005 to about 0.1 of at least one element selected from the group consisting of B and Zr; and
a balance being Co and incidental impurities.

21. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 12 of at least one element selected from the group consisting of Ta and Nb;
from about 0.1 to about 5 of Hf;
from about 0.005 to about 0.1 of at least one element selected from the group consisting of a rare earth elements and Y; and
a balance being Co and incidental impurities.

22. The Co-based alloy of claim 21, further comprising:
from about 0.005 to about 0.1 of at least one element selected from the group consisting of B and Zr.

23. A Co-based alloy consisting essentially of, in weight percent:

from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 5 of Hf;
from about 0.005 to about 0.1 of at least one element selected from the group consisting of B and Zr;
from about 0.1 to about 10 of at least one element selected from the group consisting of W and Mo; and
a balance being Co and incidental impurities.

24. A Co-based alloy consisting essentially of, in weight percent:
from about 0.1 to about 1.2 of C;
from about 0.01 to about 2 of at least one element selected from the group consisting of Si and Mn;
from about 22 to about 37 of Cr;
from about 5 to about 15 of Ni;
from about 0.1 to about 3.5 of Re;
from about 0.1 to about 5 of Hf;
from about 0,005 to about 0.1 of at least one element selected from the group consisting of B and Zr
from about 0.005 to about 0.1 of at least one element selected from the group consisting of a rare earth elements and Y; and
balance being Co and incidental impurities.

25. The Co-based alloy of claim 24, further comprising:
from about 0.1 to about 10 of at least one element selected from the group consisting of W and Mo.

26. The Co-based alloy of claim 25, further comprising:
from about 0.1 to about 12 of at least one element selected from the group consisting of Ta and Nb.

* * * * *